No. 732,819. PATENTED JULY 7, 1903.
G. J. BARNES.
INFANT'S NAIL CLEANER.
APPLICATION FILED DEC. 15, 1902.
NO MODEL.
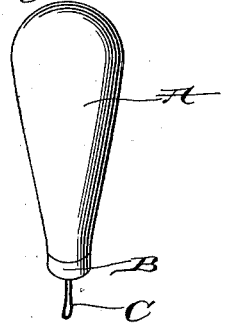
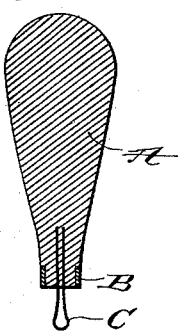
Witnesses
Inventor
Gertrude J. Barnes
By James J. Sheehy, Attorney No. 732,819. Patented July 7, 1903.

UNITED STATES PATENT OFFICE.

GERTRUDE J. BARNES, OF MINNEAPOLIS, MINNESOTA.

INFANT'S NAIL-CLEANER.

SPECIFICATION forming part of Letters Patent No. 732,819, dated July 7, 1903.

Application filed December 15, 1902. Serial No. 135,400. (No model.)

*To all whom it may concern:*

Be it known that I, GERTRUDE J. BARNES, a citizen of the United States, residing at Minneapolis, in the county of Hennepin and State of Minnesota, have invented new and useful Improvements in Manicure Implements, of which the following is a specification.

My invention relates to manicure implements; and has for its object to provide a simple and inexpensive device through the medium of which the nails of infants may be expeditiously and thoroughly cleaned without liability of injuring the tender flesh beneath the nails.

With the foregoing in mind the invention will be fully understood from the following description and claim when taken in connection with the accompanying drawings, in which—

Figure 1 is a perspective view of the device constituting the preferred embodiment of my invention, and Fig. 2 a longitudinal central section of the same.

Similar letters designate corresponding parts in both views of the drawings, referring to which—

A is the handle of my improved device, which is preferably made of wood in the shape shown; B, a ferrule on one end of the handle, and C a loop of fine flexible wire—*i. e.*, wire adapted to yield to slight pressure and resume its original form when the pressure is removed. The said loop extends from the end of the handle on which the ferrule is mounted, and its ends are embedded in the handle and secured by cement or other suitable means.

In using the implement the loop C is gently manipulated beneath the nail to be cleaned until all foreign substance is removed therefrom. When the loop is thus employed, it will be observed that its flexible character will enable it to yield to very slight pressure and return to its original form when the pressure is removed. From this it follows that the user is enabled to accommodate the loop to and remove dirt from every portion of the space beneath the nail, and this without pricking, bruising, or otherwise injuring the tender flesh.

I have entered into a specific description of the preferred embodiment of my invention in order to impart a full, clear, and exact understanding of the same. I desire it understood, however, that such changes or modifications may be made in practice as fairly fall within the scope of my invention as claimed.

I am well aware of a patent having for its subject-matter an ear-cleaner consisting of a handle made of twisted wire and having a swab at one end and an eye at its opposite end to serve as a spoon. This device, however, is not a nail-cleaner. Moreover, if it were used as such it still would not be a nail-cleaner of flexible wire or a flexible loop, for the loop in the patent is stiff and unyielding in contradistinction to fine flexible wire intended and designed and adapted to yield to slight pressure and resume its original form when the pressure is removed.

Having described my invention, what I claim is—

The herein-described implement for cleaning the nails of infants, comprising a handle, and a flexible loop of fine wire—*i. e.*, a loop of wire adapted to yield to slight pressure, and resume its original form when the pressure is removed; the said loop being secured to the handle.

GERTRUDE J. BARNES.

Witnesses:
 HENRY A. BARNES,
 WALTER H. CAMPBELL.